United States Patent [19]
Nakamura et al.

[11] Patent Number: 5,046,922
[45] Date of Patent: Sep. 10, 1991

[54] POLYMERIC CASING FOR FLUID MACHINES AND PUMPS

[75] Inventors: Toshio Nakamura; Yoshimi Soeda; Shuichi Mitsuhori; Kazuo Toubo, all of Yokohama, Japan

[73] Assignees: Nippon Zeon Co., Ltd.; Ebara Corporation, both of Tokyo, Japan

[21] Appl. No.: 454,249

[22] Filed: Dec. 21, 1989

[30] Foreign Application Priority Data

Dec. 26, 1988 [JP] Japan .................. 63-328738

[51] Int. Cl.⁵ ............ F01D 11/00; F01D 25/00
[52] U.S. Cl. ..................... 415/172.1; 415/200
[58] Field of Search ............ 415/200, 206, 204, 214.1, 415/170.1, 172.1, 174.5, 126, 177; 417/423.14; 277/53, 178

[56] References Cited

U.S. PATENT DOCUMENTS

| | | | |
|---|---|---|---|
| 2,652,191 | 9/1953 | Buchi | 415/204 |
| 2,764,099 | 9/1956 | Wernert | 415/200 |
| 3,304,875 | 2/1967 | Copeland | 415/200 |
| 3,664,760 | 5/1972 | Reiner | 415/200 |
| 3,876,327 | 4/1975 | Lobanoff | 415/200 |
| 4,680,006 | 7/1987 | Fisher | 415/204 |
| 4,952,348 | 8/1990 | Ishimaru et al. | 525/290 |

FOREIGN PATENT DOCUMENTS

129013  1/1983  Japan.
51911   3/1984  Japan.

Primary Examiner—Edward K. Look
Assistant Examiner—Hoang Nguyen
Attorney, Agent, or Firm—George A. Kap; Thoburn T. Dunlap

[57] ABSTRACT

This invention is directed to a fluid pump containing a structural member, such as casing, which the fluid contacts as it enters the pump, and to a structural member having sufficient mechanical strength and flexibility for use in a fluid pump, such as a casing, which is made of a ring-opened polymer of a norbornene-type monomer containing an effective amount of an elastomer, the structural member has heat distortion temperature of over 120° C., elongation at break of 15 to 80%, and flexural modulus of elasticity of 170 kg/mm² or above.

18 Claims, 4 Drawing Sheets

FIG. 2.

POLYMERIC CASING FOR FLUID MACHINES AND PUMPS

BACKGROUND OF INVENTION

The casing of fluid machines such as pumps, compressors, blowers, and the like is often produced by casting cast iron, or other metals. However, casings made of cast iron and like metals tend to be damaged by water hammer or freezing and also tend to be broken by the action of external forces at the site of use. In addition to these problems, there is the problem of corrosion resistance: red rust appears and rusting occurs. To avoid this, it is necessary to use high-grade metals such as high-nickel alloys, so the casing is expensive and there are economic problems. Moreover, there are the drawbacks that it is heavy and its installation work is complicated.

Hence, casings made of plastic have recently been developed with a focus on the fact that they have superior corrosion resistance and are lighter than casings made of cast iron. However, conventional casings made of plastic are made of polyester, furan resin, polyurethane, nylon, and similar plastics that are reinforced with glass fibers, i.e., FRP (fiber reinforced plastics), so they have drawbacks.

That is, FRP casings are assured of rigidity because they are strengthened or reinforced with fibers, which is a reinforcing material. But on the other hand, there are the drawbacks in that the mechanical strength is directional because of the orientation of the fibers so pressure resistance to fluid pressure acting in all directions is insufficient. Also, flexibility is lacking so the casing is susceptible to the impact of water hammer. In the case of glass fibers, there is also the drawback that adhesion between the fibers and plastic is not always sufficient so the glass fibers inside the plastic that comprises the casing are corroded by the fluid and the durability of the casing declines. Moreover, because glass fibers are mixed in, there are limits to weight reduction of the casing.

Furthermore, when preparing such FRP casings, the casings are produced by the hand lay-up method which requires manual labor. This introduces the concern that the glass fibers will scratch the hands of the workers at that time. Thus, the working environment is not ideal and along with that, productivity is inferior.

Also, the plastics used in conventional methods have polarity so there are concerns about their water resistance. There is also the problem that dimensional changes in the casing may be too great for the plastics presently used for such applications.

When the present inventors conducted an intensive investigation of plastic casings for fluid machines where pressure resistance is demanded, they discovered that if a specific norbornene type polymer is used as the material of the casing, it has sufficiently high rigidity without mixing in glass fibers, or other reinforcing materials, and the drawbacks that accompany the mixing in of glass fibers can be solved in one stroke. At the same time, the norbornene polymer also excels in impact resistance, water resistance, and chemical resistance. Also, by working out the casing shape, a so-called flexible structure casing that is easily deformed by fluid pressure but has very superior pressure resistance can be obtained.

OBJECTIVES OF INVENTION

This invention was developed with the primary objective to provide a light-weight casing for fluid machines that excels in pressure resistance, impact resistance, corrosion resistance, water resistance, and chemical resistance and that also excels in moldability, workability, and productivity during manufacture.

Another objective of this invention is to provide the construction of a specific pump that utilizes such a casing.

SUMMARY OF INVENTION

This invention is directed to structural components that come in contact with passing fluid and to fluid machines that incorporate such structural components which can expand and shift in response to the pressure of the contacting fluid. Structural components referred to herein are molded from at least one norbornene-type monomer containing three or more cyclic structures or rings with an elastomer in the presence of a metathesis ring-opening catalyst system. The resulting ring-opened polymers have distortion temperature greater than 100° C. and elongation at break of 10 to 100.

DETAILED DESCRIPTION OF INVENTION

Figure 1:
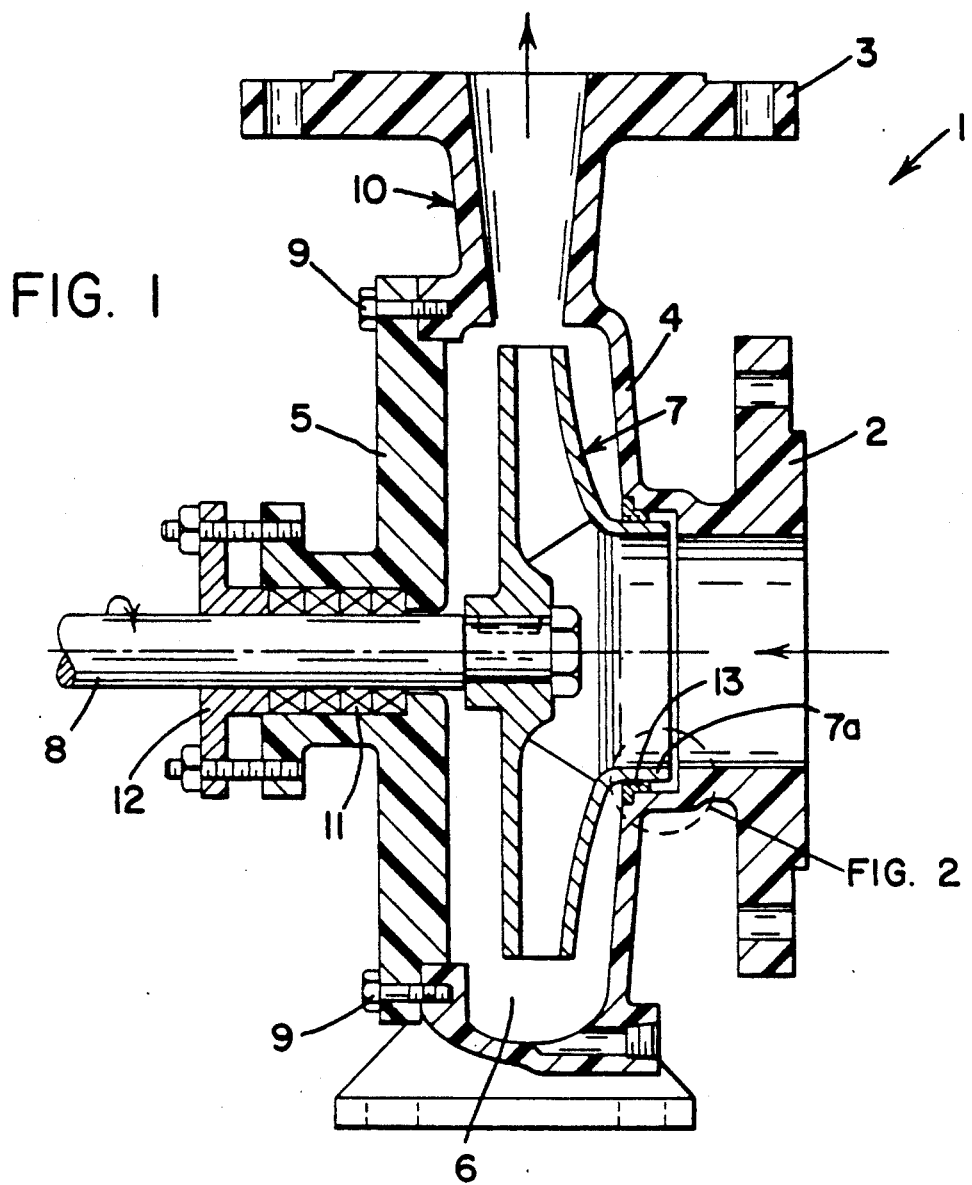
FIG. 1 is a cross section of a pump of one embodiment of this invention.

The present invention relates to structural components, such as casings and gland covers, for fluid machines, such as pumps and to pumps themselves that incorporate such structural components. Such structural components are light in weight and have both the necessary mechanical strength and flexibility. The pumps of this invention are characterized by the fact that they have casings, including gland covers, that can expand and shift in response to the fluid pressure of the fluid contacting same.

The norbornene type polymer modified with an elastomer, described herein, possesses both mechanical strength and flexibility so the casing formed from this material excels in pressure resistance. Moreover, even among plastics it is relatively light, with a specific gravity of about 1.05 g/cm$^3$ or less, and it is a material that excels in impact resistance, corrosion resistance, water resistance, and chemical resistance, so a casing that excels in these properties is obtained. Such a casing of this invention has the advantages that it can also withstand damage by water hammer and freezing, which are problems with metal castings, and is not likely to be damaged even by a great external force during installation on site.

When producing such casings, they can easily be molded into the desired shape by reaction injection molding in a mold without mixing in glass fibers or other reinforcing materials, so they are also superior in } moldability, workability, and productivity during manufacture.

According to the pump of this invention that utilizes such a casing, even if fluid pressure should act on the inside of the casing, such a casing is able to withstand that pressure by expanding, and a pump containing such a casing possesses a higher degree of pressure resistance.

The casing for fluid machines of this invention can be used as the casing for pumps, compressors, blowers, or other fluid machines. The term "casing" should be understood in a broad sense that includes not only things generally labeled as casings but also gland covers, and includes all parts on which the fluid pressure of the fluid that flows through it acts.

Such a casing for fluid machines of this invention is molded with a ring-opening polymer of a norbornene type monomer with three or more rings that are modified with an elastomer. Such a material has heat distortion temperature about 100° C., preferably above 120° C., and elongation at break of 10 to 100%, preferably 15-80%. It usually has flexural modulus of elasticity of 150 kg/mm$^2$ or above, preferably 170 kg/mm$^2$ or above.

Examples of the norbornene type monomers with three or more rings include 3-ring monomers such as dicyclopentadiene and dihydrodicyclopentadiene, 4-ring monomers such as tetracyclododecene, 5-ring monomers such as tricyclopentadiene, and 7-ring monomers such as tetracyclopentadiene. Of course, suitable herein are the alkyl-substituted or alkylidene-substituted form of these containing 1 to 8 carbon atoms in each alkyl group and 1 to 4 carbon atoms in each alkylidene group. Included herein are also cyclopentadiene oligomers which are composed mostly of cyclopentadiene trimers and cyclopentadiene tetramers. The cyclopentadiene oligomers are obtained by heating dicyclopentadiene at 110° to 250° C. for 0.1 to 20 hours. The low boilers are preferably removed. The cyclopentadiene trimers so obtained contain about 80% asymmetrical trimers and about 20% of symmetrical trimers.

These norbornene type monomers can be used individually, or two or more can be mixed and used. Among these, three to five ring monomers are preferred in terms of rigidity, impact resistance, and heat distortion temperature. From an economic aspect in particular, monomers containing more than 50% by weight of dicyclopentadiene are best.

Up to 20%, preferably 1 to 10% by weight based on the weight of the entire monomer charge, a comonomer selected from bicyclic norbornene-type monomers and monocyclic cycloolefins containing 4 to 12 carbon atoms in the cyclic structure can be used. Bicyclic norbornene monomers include norbornenes, monoalkyl and dialkyl norbornenes with each alkyl group containing 1 to 12, preferably 1 to 4 carbon atoms such as 5-methyl-2-norbornene, and mixtures thereof. Monocyclic cycloolefins include monomers such as cyclobutene, cyclopentene, cyclopentadiene, cyclooctene, cyclododecene and mixtures thereof. Such comonomers can be polymerized by ring-opening along with one or more of the above-indicated norbornene-type monomers with three or more rings.

As the elastomer used in this invention, examples thereof include natural rubber, polybutadiene, polyisoprene, styrene-butadiene copolymer, styrene-butadiene-styrene block copolymers, styrene-isoprene-styrene block copolymer, hydrogenated products of these block copolymers, ethylene-propylene-diene copolymer, polychloroprene, acrylonitrile-butadiene copolymer, and the like. Among these, however, hydrocarbon elastomers are preferred.

The mixing ratio of these elastomers can be appropriately selected in a range such that the elongation at break of the norbornene type polymer is 10 to 100%, preferably 15-80%. Amount of elastomers is usually 3-12% by weight, preferably 5-10% by weight, based on the weight of said monomer.

When the amount of elastomer compounded is too low, elongation decreases and as a result, flexibility is insufficient and pressure resistance and water hammer resistance become inferior. Moreover, it becomes impossible to produce a flexible structure casing from such a material. On the other hand, when the amount of elastomer compounded is too great, elongation will be greater but conversely, the flexural modulus of elasticity will decline and the polymer will not retain the rigidity necessary for a casing.

Also, reinforcement materials such as glass fibers, carbon fibers, and aramid fibers may be compounded provided that it is to an extent that does not essentially harm the effects of this invention.

To obtain a norbornene type polymer modified with an elastomer, a reaction molding method such as reaction injection molding, resin injection method, or casting method is usually used. These methods are carried out by feeding a reaction solution containing the norbornene type monomer, elastomer, and ring-opening polymerization catalyst into the mold where ring-opening polymerization is carried out. Specific examples of these methods are described, for example, in Japanese Patent Documents 58-129013 and 59-51911.

The properties of the casing of this invention can be modified by compounding various additives such as fillers, pigments, colorants, and antioxidants at the time of the reaction. These additives are mixed in either or both of the reaction solutions before the solutions are mixed and injected into a mold.

Among fillers, there are inorganic fillers such as glass particles, carbon black, talc, calcium carbonate, and mica.

As antioxidants, there are various antioxidants for plastics and rubbers such as phenolic type, phosphorus type, and amine type. These antioxidants may be used individually, but they can also be used together. The compounding ratio of the antioxidants is 0.5 weight percent, or more, preferably 1-3 weight percent, with respect to the norbornene type monomer(s).

This invention will now be presented more specifically on the basis of the embodiments shown in the drawings.

Figure 2:
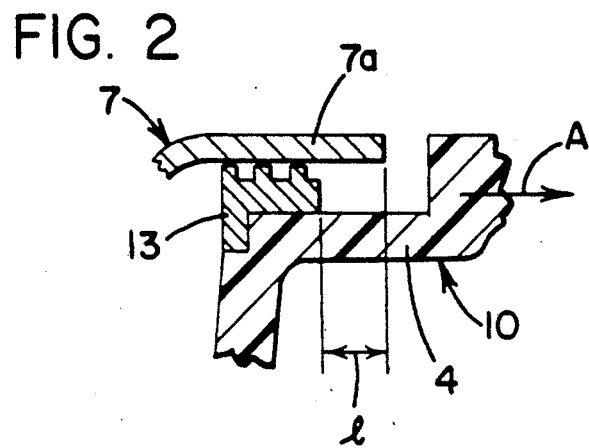
FIG. 2 is an enlarged cross section of the essential parts of the pump shown in FIG. 1.
Figure 3:
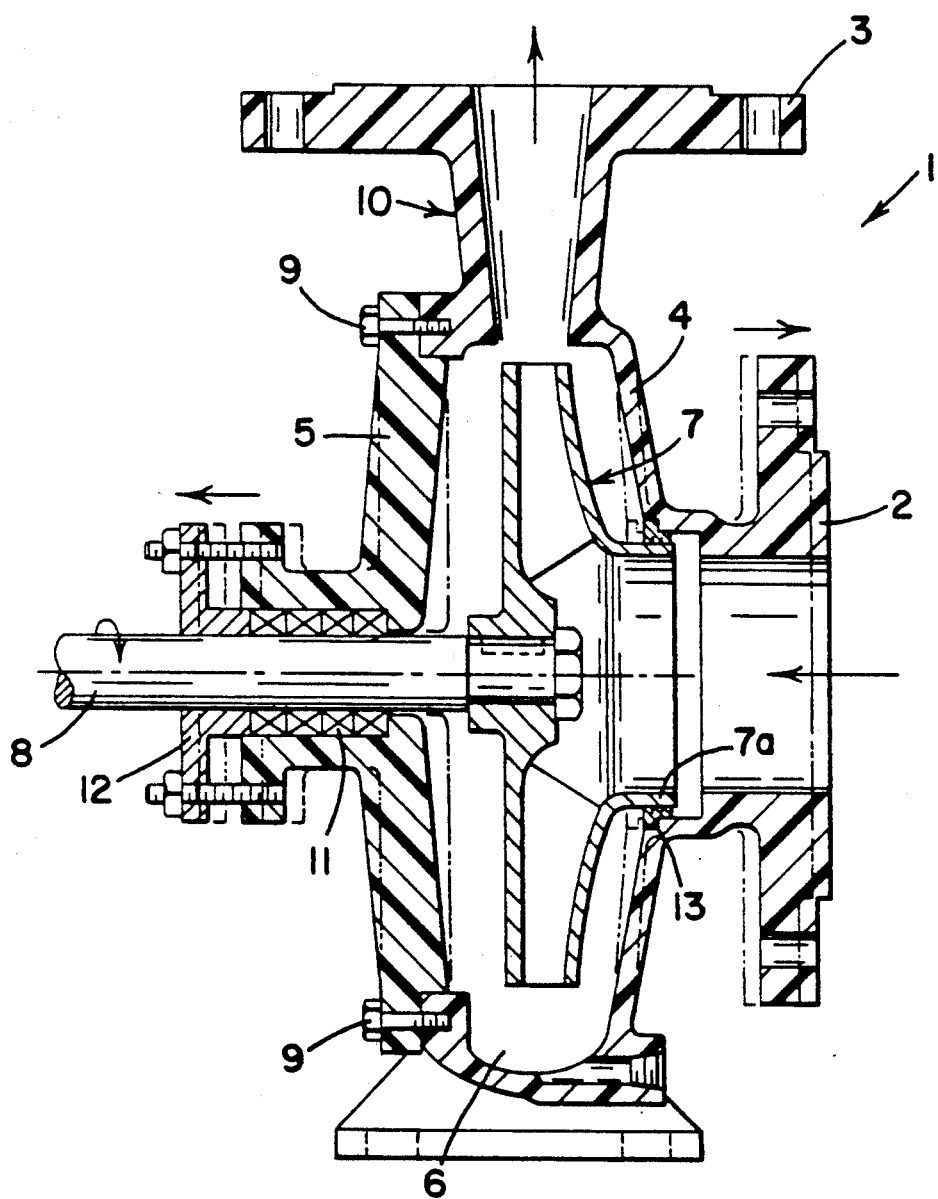
FIG. 3 is a cross section showing the action of the pump shown in FIG. 1.
Figure 4:
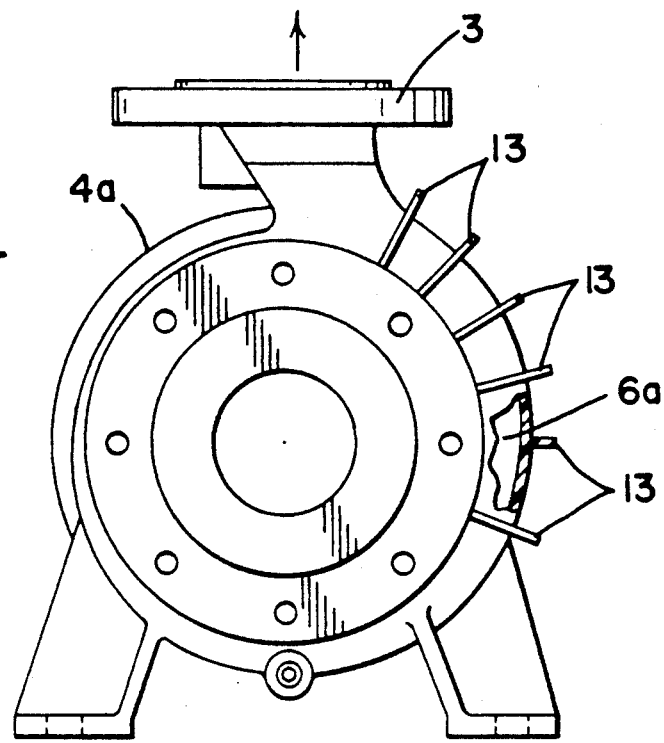
FIGS. 4 and 5 are frontal views of the casing of a pump of other embodiments of this invention.
Figure 5:
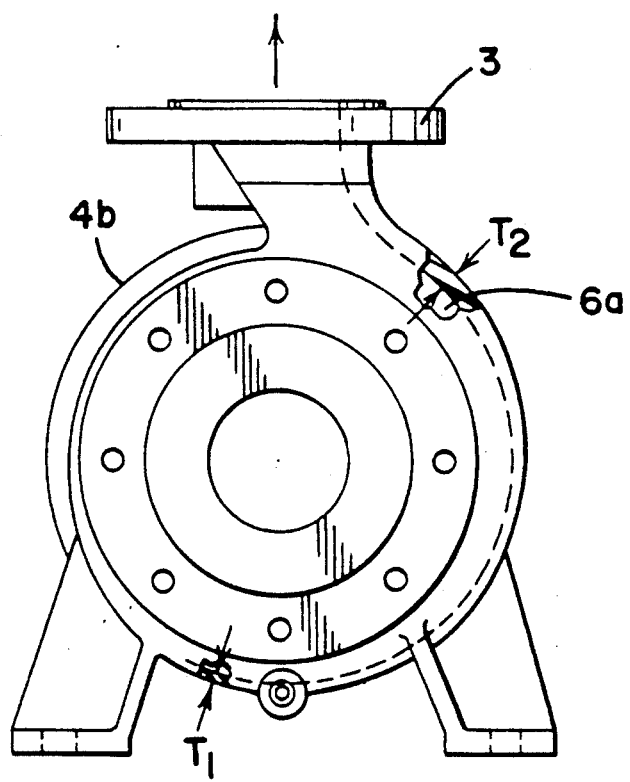
Figure 6:
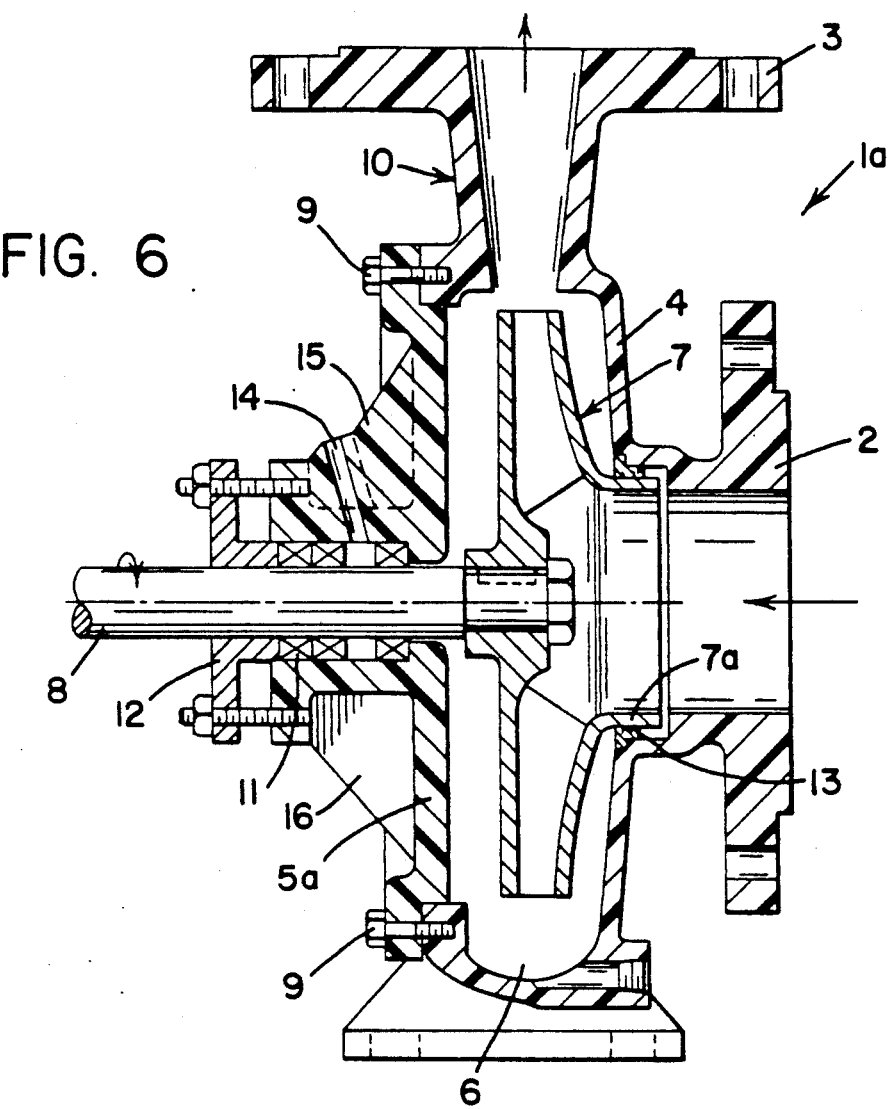
FIG. 6 is a cross section of the pump of still another embodiment of this invention.
Figure 7:
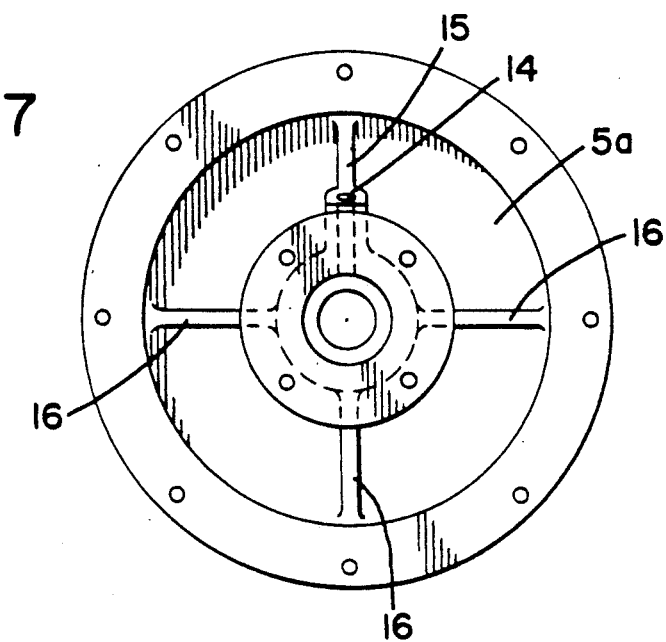
FIG. 7 is a frontal view of the gland cover used in the embodiment shown in FIG. 6.

FIG. 1 is a cross section of a pump of one embodiment of this invention. FIG. 2 is an enlarged cross section of the important parts of the pump shown in FIG. 1, and FIG. 3 is a cross section that shows the action of this pump. FIGS. 4 and 5 are frontal views of the casing of a pump of other practical embodiments of this invention. FIG. 6 is a cross section of the pump of still another embodiment of this invention, and FIG. 7 is a frontal view of the gland cover used by the embodiment shown in FIG. 6.

Pump 1 of the embodiment of this invention shown in FIG. 1 is a type of centrifugal pump. Impeller 7 is installed and is free to rotate in flow path 6 of casing 10 comprising casing body 4, consisting of suction side flange 2 and discharge side flange 3 that are formed as an integral unit, and gland cover 5. Impeller 7 is affixed to the end of rotating shaft 8 so that it rotates with the rotation of rotary shaft 8.

The casing body 4 and gland cover 5 that compose casing 10 are connected by bolts 9 to form flow path 6 that accommodates impeller 7 within it. To prevent the fluid from leaking through the gap between gland cover 5 and rotating shaft 8, packing 11 is fitted in the gap between them and this packing 11 is retained by a gland follower 12. To prevent the fluid inside casing 10 on the discharge side from flowing back to the suction side, a sealing mechanism 13, such as a labyrinth seal, has been installed in the gap between the outer periphery of lip 7a of impeller 7 and the inner periphery of casing body 4, as shown in FIG. 2.

In the embodiment shown in FIG. 1, the shape of casing body 4 and gland cover 5 has been made symmetric in the peripheral direction so that casing 10 comprising casing body 4 and gland cover 5 is expanded and shifted along the axial direction of rotary shaft 8 by the fluid pressure in flow path 6. Also, the distance l from the end of lip 7a of impeller 7 to sealing mechanism 13 has been made long enough that even if casing body 4 expands and shifts in the axial direction shown by arrow, the sealing performance of sealing mechanism 13 is sufficiently retained. The value of l is not necessarily fixed since it depends on the size of the pump, the pressure-resistance performance demanded, and the shape and type of materials of the casing. However, the value l can easily be established if these conditions are specified. For example, when producing a casing of the shape indicated in FIG. 1 using the materials described in the embodiment 1 of Example 1 below, l will be about 5-20 mm when the suction diameter is 100 mm and about 2-10 mm when the suction diameter is 50 mm.

According to pump 1 of the embodiment shown in FIG. 1, when impeller 7 rotates and the fluid pressure in flow path 6 rises, the casing body 4 and gland cover 5 are able to withstand that fluid pressure because of expanding and shifting in the axial direction of rotating shaft 8, as shown in FIG. 3. When a sudden fluid impact, such as water hammer, is experienced, damage is not likely to be incurred because the casing material itself has excellent flexibility and it also absorbs that impact by means of the above-indicated structure. Moreover, even if casing 10 should expand and shift in the axial direction in this manner, pump performance never declines because it has been designed so that its sealing performance is not affected.

This invention is not limited to the embodiment described above and various modifications can be made within the ranges of this invention. For example, when flow path 6a formed inside casing body 4a, 4b is formed in a spiral as shown in FIGS. 4 and 5, the shape of casing body 4a, 4b becomes asymmetrical in the peripheral direction, so there is concern that it will not expand and shift in the axial direction. To prevent that, one need only provide reinforcing ribs 13 in the discharge side part of casing body 4a where the fluid pressure in flow path 6a is high, see FIG. 4, or make the wall thickness $t_2$ on the discharge side of casing body 4b thicker than the casing wall thickness $t_1$ on the suction side, see FIG. 5.

When rib 15 for seal flooding hole 14 is formed in gland cover 5a as shown in FIGS. 6 and 7, ribs 16 may be provided in specified locations in the peripheral direction to maintain a balance with rib 15.

In the embodiments discussed above, casings of the vertically divided type comprising a casing body and a gland cover have been described, however, this invention is not limited to these embodiments. That is, it can also be applied to casings of the horizontally divided type comprising an upper casing body and a lower casing body.

As explained above, according to this invention, even if fluid pressure acts inside the casing, the casing can withstand that fluid pressure by expanding, so it excels in pressure resistance.

Also, the casing of this invention is formed with a ring-opening polymer of a norbornene type monomer with three or more rings that is modified with an elastomer, so it excels in impact resistance, corrosion resistance, water resistance, and chemical resistance. Moreover, it is light in weight because it is not reinforced with fibers. Further, when such a casing is manufactured, it can easily be molded into the desired shape by reaction injection molding inside a mold without mixing in fibers so it also excels in moldability, workability, and productivity during manufacture.

This invention will now be described on the basis of more specific examples. Parts and percentages in the examples are based on weight unless otherwise indicated.

Example 1

A monomer mixture containing 2% of phenolic antioxidant (trade name Irganox 1010 manufactured by Ciba-Geigy) was placed in two containers. In one, 0.4 part of diethylaluminum chloride (DEAC), 0.15 part of n-propanol, 0.36 part of silicon tetrachloride, and 6 parts of a styrene-isoprene-styrene block copolymer (Kraton 1170 manufactured by Shell, hereinafter abbreviated as "SIS") were added per 100 parts of monomer mixture, and this was designated solution A.

In the other container, 0.3 part of tri(tridecyl)ammonium molybdate was added per 100 parts of monomer mixture, and this was designated solution B.

Solutions A and B were respectively fed to a power mixer by a gear pump so as to give a volumetric ratio of 1:1 and then poured quickly into a mold with a space volume of 200 mm × 200 mm × 3 mm and heated to 70° C. The pouring time was approximately 10 seconds and a reaction was carried out inside the mold for 3 minutes. This series of operations was carried out in a nitrogen gas atmosphere.

The physical property values of the molded articles obtained were determined and the results are shown in Table 1. The results in Table 1 show that these molded articles possess stiffness and flexibility and are also light in weight and excell in heat resistance, impact resistance, water resistance, and chemical resistance.

TABLE 1

| Experiment No. | 1 | 2 |
| --- | --- | --- |
| Monomer composition (parts) | | |
| Dicyclopentadiene | 85 | 75 |
| Cyclopentadiene trimer*1 | 15 | — |
| Methyltetracyclodecene | — | 25 |
| Physical property values | | |
| Specific gravity (g/cm$^3$) | 1.04 | 1.04 |
| Heat distortion temperature*2 (°C.) | 140 | 145 |
| Elongation at break*3 (%) | 30 | 25 |
| Flexural modulus of elasticity*4 (kg/mm$^2$) | 190 | 200 |
| Izod impact strength*5 (kg.cm/cm) | 30 | 28 |
| Water absorption*6 (%) | 0.12 | 0.13 |
| Chemical resistance*7 | | |

TABLE 1-continued

| Experiment No. | 1 | 2 |
|---|---|---|
| 30% sulfuric acid (%) | 0.23 | 0.25 |
| 40% caustic soda (%) | 0.01 | 0.01 |

*[1] Mixture of approx. 80% asymmetric type and approx. 20% symmetric type
*[2] JIS K-6911, load 18.5 kg
*[3] JIS K-7113
*[4] JIS K-7203
*[5] JIS K-7110, 6.5 (with notch)
*[6] JIS K-7209, weight increase after immersion at 23° C. for 24 hours
*[7] Weight increase after immersion at 23° C. for 7 days Example 2

A reaction was carried out according to Experiment No. 1 of Example 1, except for varying the amount of the SIS compound.

The results are shown in Table 2. These results shown that the molded articles that were not modified with an elastomer have inferior flexibility and impact resistance but when too much elastomer was compounded, the molded articles were inferior in heat resistance and stiffness.

TABLE 2

| Experiment No. | 3 | 4 | 5 |
|---|---|---|---|
| Amount of SIS added (parts) | 0 | 8 | 15 |
| Physical property values | | | |
| Specific gravity (g/cm$^3$) | 1.04 | 1.03 | 1.02 |
| Heat distortion temp. (°C.) | 145 | 130 | 90 |
| Elongation at break (%) | <5 | 70 | 200 |
| Flexural modulus of elasticity (kg/mm$^2$) | 220 | 170 | 100 |
| Izod impact strength (kg.cm/cm) | 4.5 | 30 | 31 |
| Water absorption (%) | 0.10 | 0.15 | 0.17 |
| Chemical resistance | | | |
| 30% sulfuric acid (%) | 0.20 | 0.25 | 0.25 |
| 40% caustic soda (%) | 0.01 | 0.02 | 0.01 |

Example 3

A casing body and gland cover were produced in the shape described in FIG. 1 in the same manner as in Experiment No. 1 of Example 1. The principal dimensions of the casing were as follows:

Casing body: Volute base round diameter 200 mm, maximum wall thickness 20 mm, suction diameter 50 mm, discharge diameter 32 mm Gland Cover: Shaft diameter 32 mm, maximum wall thickness 28 mm.

The casing and gland cover obtained were set up with the bearing body, couplings and motor. Water-pressure test of the composite was carried out. When the water pressure was 12 kg/cm$^2$, it expanded axially on the suction side by 1.96 mm and on the gland side by 3.46 mm.

The pressure-resistance performance as a container with casing and gland cover set up was confirmed as being over 16 kg/cm$^2$ by the water-pressure test.

Moreover, in a pump performance test, the casing and gland cover expanded axially as the pressure rose but no particular abnormality was found in pump performance.

We claim:

1. A fluid machine comprising a casing means forming a chamber, a shaft means projecting into said chamber, an impeller means associated with said shaft means and rotatable therewith, a suction opening associated with said casing means, a discharge opening associated with said casing means, the suction opening is positioned to introduce a fluid into the chamber wherefrom said impeller means moves the fluid to the discharge opening, the improvement residing in said casing means which expands and shifts along an axial direction of said shaft means due to pressure of the fluid inside the chamber and which is molded to a desired configuration by polymerizing a reaction solution in a mold, said reaction solution comprising at least one norbornene-type monomer, an elastomer, and a metathesis ring-opening catalyst system, said polymeric material having a heat distortion temperature of over 100° C. and an elongation at break of 10 to 100%.

2. The fluid machine of claim 1 wherein said polymeric material has a heat distortion temperature above 120° C., an elongation at break of 15 to 80%, and a flexural modulus of elasticity above 150 kg/mm$^2$.

3. The fluid machine of claim 1 wherein said casing means is made symmetric in the peripheral direction.

4. The fluid machine of claim 1 wherein said casing means includes reinforcing ribs.

5. The fluid machine of claim 2 wherein said casing means has a variable thickness which uniformly increases toward said discharge opening.

6. The fluid machine of claim 2 wherein said monomer is selected from the group consisting of dicyclopentadiene, dihydrodicyclopentadiene, tetracyclododecene, tricyclopentadiene, tetracyclopentadiene, alkyl-substituted monomers thereof containing 1 to 8 carbon atoms in each alkyl group, alkylidene-substituted monomers thereof containing 1 to 4 carbon atoms in each alkylidene group, and mixtures thereof; wherein said elastomer is selected from the group consisting of natural rubbers, polybutadienes, polyisoprenes, styrene-butadiene-styrene block copolymers, styrene-isoprene-styrene block copolymers, hydrogenated products of these block copolymers, ethylene polymers, ethylene propylene copolymers, ethylene-propylene-diene copolymers, polychloroprenes, acrylonitrile-butadiene copolymers, and mixtures thereof; and wherein said polymeric material is devoid of reinforcing material.

7. The fluid machine of claim 2 wherein said norbornene-type monomer is selected from the group consisting of norbornene monomers containing three cyclic structures, norbornene monomers containing four cyclic structures, norbornene monomers containing five cyclic structures, and mixtures of such monomers; wherein said polymeric material contains at least 0.5 weight percent of an antioxidant, based on the weight of said monomer; and wherein said polymeric material has a flexural modulus of elasticity of 170 kg/mm$^2$ and above.

8. The fluid machine of claim 7 wherein said norbornene-type monomer is selected from the group consisting of dicyclopentadiene, dihydrodicyclopentadiene, cyclopentadiene oligomers, tetracyclododecene, methyl tetracyclododecene, tricyclopentadiene, and mixtures thereof; and wherein the amount of said antioxidant is 1 to 3%.

9. The fluid machine of claim 8 including means for allowing said casing means to shift relative to said impeller means.

10. The fluid machine of claim 1 including sealing means associated with said casing means for preventing entry of fluid into said chamber, wherein the amount of said elastomer is 3 to 12% by weight, based on the weight of said monomer.

11. A structural member for a fluid machine at least partially composed of a polymeric material which is molded to a desired configuration by polymerizing a reaction solution in a mold, said reaction solution comprising at least one norbornene-type monomer, an elastomer and a metathesis ring-opening catalyst system, said polymeric material having a heat distortion temperature of over 100° C., an elongation at break of 10 to 100%, and a flexural modulus of elasticity of 150 kg/mm$^2$ or more.

12. The structural member of claim 11 wherein the member is a casing body of a casing means.

13. The structural member of claim 11 wherein the member is a gland cover of a casing means.

14. The structural member of claim 11 wherein said norbornene-type monomer is selected from the group consisting of norbornene monomers containing three rings, norbornene monomers containing four rings, norbornene monomers containing five rings, alkyl substituted monomers thereof containing 1 to 8 carbon atoms in each alkyl group, alkylidene substituted monomers thereof containing 1 to 4 carbon atoms in each alkylidene group, and mixtures thereof; amount of said elastomer is 3 to 12% by weight and said elastomer is selected from the group consisting of natural rubbers, polybutadienes, polyisoprenes, styrene-butadiene copolymers, styrene-butadiene-styrene block copolymers, styrene-isoprene-styrene block copolymers, hydrogenated products of these block copolymers, ethylene polymers, ethylene-propylene copolymers, ethylene-propylene-diene copolymers, polychloroprenes, acrylonitrile-butadiene copolymers, and mixtures thereof; and wherein said polymeric material is devoid of reinforcing material.

15. The structural member of claim 14 wherein said norbornene-type monomer is selected from the group consisting of dicyclopentadiene, dihydrodicyclopentadiene, tetracyclododecene, methyltetracyclododecene, triclopentadiene, cyclopentadiene oligomers, and mixtures thereof.

16. A structural member devoid of reinforcing material for a fluid machine comprising a polymeric material which is molded to a desired configuration by polymerizing a reaction solution in a mold, said reaction solution comprising at least one norbornene-type monomer, a metathesis catalyst system and 3 to 12% by weight of an elastomer, said member has a heat distortion temperature of over 120° C., elongation at break of 15 to 80%, and a flexural modulus of elasticity of 170 kg/mm$^2$ or above.

17. The structural member of claim 16 wherein said norbornene-type monomer is selected from the group consisting of dicyclopentadiene, dihydrodicyclopentadiene, cyclopentadiene oligomers, tetracyclododecene, methyltetracyclododecene, tricyclopentadiene, and mixtures thereof; and wherein said elastomer is selected form the group consisting of natural rubbers, polybutadienes, polyisoprenes, styrene-butadiene copolymers, styrene-butadiene-styrene block copolymers, styrene-isoprene-styrene block copolymers, hydrogenated products of these block copolymers, ethylene polymers, ethylene propylene copolymers, ethylene-propylene-diene copolymers, polychloroprenes, acrylonitrile-butadiene copolymers, and mixtures thereof; and wherein said polymeric material is devoid of reinforcing material.

18. The structural member of claim 17 wherein said polymer contains 1 to 10% by weight of a comonomer, based on the weight of the entire monomer charge, selected from the group consisting of bicyclic norbornene-type monomers, monocyclic cycloolefins containing 4 to 12 carbon atoms in the cyclic structure, and mixtures thereof.

* * * * *

UNITED STATES PATENT AND TRADEMARK OFFICE
CERTIFICATE OF CORRECTION

PATENT NO. : 5,046,922

DATED : September 10, 1991

INVENTOR(S) : Toshio Nakamura, Yoshimi Soeda, Shuichi Mitsuhori, and Kazuo Toubo It is certified that error appears in the above-identified patent and that said Letters Patent is hereby corrected as shown below:

On the title page, item (73):

The joint assignee of record appearing on the face of the patent should read --Nippon Zeon Co., Ltd.--.

Column 7, line 17, "shown" should read --show--.

Column 8, line 21, the dependency of claim 5 should read claim --1--.

Column 8, line 34, after "polyisoprenes" insert the term --styrene-butadiene copolymers,--.

Signed and Sealed this

First Day of February, 1994

Attest:

BRUCE LEHMAN

*Attesting Officer*  *Commissioner of Patents and Trademarks*